(12) United States Patent
Nielsen

(10) Patent No.: US 6,308,806 B1
(45) Date of Patent: *Oct. 30, 2001

(54) BRAKE ASSEMBLY FOR A CYCLE

(76) Inventor: Peter M. Nielsen, 21 Nut Island Ave., Quincy, MA (US) 02169

( * ) Notice: Subject to any disclaimer, the term of this patent is extended or adjusted under 35 U.S.C. 154(b) by 0 days.

This patent is subject to a terminal disclaimer.

(21) Appl. No.: 09/394,828

(22) Filed: Sep. 13, 1999

(51) Int. Cl.$^7$ ..................................................... B62L 1/00
(52) U.S. Cl. ..................... 188/24.11; 188/24.12; 188/24.21; 188/73.32
(58) Field of Search .................. 188/24.22, 24.11–24.21, 188/73.32, 73.31, 73.1, 250 B, 250 G, 234, 243, 244, 245, 246; 280/280, 288.3, 281.1, 275, 276, 279, 284

(56) References Cited

U.S. PATENT DOCUMENTS 4,469,205 * 9/1984 Stoka et al. .
5,803,207 * 9/1998 Nielsen ........................... 188/24.12

* cited by examiner

*Primary Examiner*—Douglas C. Butler
(74) *Attorney, Agent, or Firm*—Pandiscio & Pandiscio

(57) ABSTRACT

A brake assembly for a cycle is provided which comprises a pair of caliper brake arms each having a pocket for receiving a portion of a brake pad, and a brake pad unit engaged with the brake arms, the brake pad unit comprising two brake pads carried by a spring which acts against the two brake arms so as to bias those brake arms in a direction to move the brake pads away from one another and the wheel which they are intended to engage. The brake assembly is installed in a fork crown which is adapted to be attached to a steerer tube in the case of a front wheel application or to a part of a cycle frame in the case of a rear wheel application, In a front wheel application, the fork crown accommodates part of a cable-driven mechanism for operating the brake arms, whereby to effect braking of the cycle.

32 Claims, 19 Drawing Sheets

BRAKE ASSEMBLY FOR A CYCLE

BACKGROUND OF THE INVENTION

1. Field Of The Invention

This invention relates to wheel brakes and is directed more particularly to a caliper-type wheel brake assembly for a cycle.

2. Description Of The Prior Art

Caliper-type brake assemblies for bicycles, and the like, are known in the art. The present invention is an improvement of the invention for "Brake Assembly for A Cycle" disclosed and claimed in my U.S. Pat. No. 5,803,207, issued Sep. 8, 1998. The information disclosed in my U.S. Pat. No. 5,803,207 is incorporated herein by reference thereto.

The brake assembly invention described and claimed in my U.S. Pat. No. 5,803,207 offers the advantages of the brake caliper arms being largely housed in frame portions of a cycle, so that the brake assembly detracts minimally from the cycle aerodynamics and the braking load is smoothly transferred to the frame of the cycle without substantial vibration. The invention disclosed in my prior patent offers additional advantages as follows: (1) the brake assembly is substantially protected from dirt and other road contaminants, (2) the brake assembly comprises identical caliper arms, so that only one form of arm need be manufactured, (3) "tolerance stack-up" is essentially eliminated and (4) changing of brake pads is a relatively simple and quick operation.

SUMMARY OF THE INVENTION

An object of the present invention is to provide a brake assembly for a cycle which improves upon the brake assembly disclosed and claimed in my prior U.S. Pat. No. 5,803,207.

A more specific object of the invention is to provide a caliper-type brake assembly which improves upon the brake assembly disclosed in my prior patent by eliminating any tendency of the caliper arms to apply a torsional force to the brake actuating mechanism, or vice versa, when the brake is actuated.

A further object of the invention is to provide a brake assembly of the type described which is characterized by an improved arrangement for mounting the brake arms to a fork crown of a cycle and an improved replaceable brake unit, the new arrangement and brake unit offering the advantages of reducing frictional forces on the caliper brake arms, simplifying the task of assembling and disassembling the brake assembly, and reducing weight and manufacturing and assembling costs.

A further object of the invention is to provide an auxiliary spring means that operates to keep the brake caliper arms in non-braking position when it is desired to remove and replace the brake pads.

A further object of the invention is to provide an improved arrangement for guiding the cable that operates the brake assembly, so as to facilitate operation of the brake assembly.

Still another object of the invention is to provide brake pads which can be reversed, i.e., re-oriented, to alter the position of the brake pads with respect to the cycle wheel which they are intended to engage for braking purposes.

A further object of the invention is to provide a novel brake pad design which makes their replacement easy and also extends their useful life.

Still another object of the invention is to provide a hand-operated caliper-type brake assembly which incorporates a hydraulic cylinder arrangement for operating the brake arms.

The foregoing objects, and other objects disclosed or rendered apparent by the following description, are achieved by providing a brake assembly for a cycle which comprises a pair of caliper brake arms each provided with a pocket for receiving a portion of a brake pad, and a brake pad unit engaged with the brake arms, the brake pad unit comprising two brake pads carried by a spring which acts against the two brake arms so as to bias those brake arms in a direction to move the brake pads away from one another and the wheel which they are intended to engage. The brake assembly is installed in a novel fork crown which is shaped internally so as to accommodate and support the caliper brake arms. The fork crown is adapted to be attached to a steerer tube or to a tube forming part of a cycle frame, with the fork crown providing a passageway for a cable-operated mechanism for applying a force to the caliper brake arms that causes the latter to pivot in a direction that causes the brake pads to move toward one another for engagement with a wheel, whereby to effect braking of the cycle.

Still other features and advantages of the invention, including various novel details of construction and combination of parts and changes thereto, are more particularly described hereinafter with reference to the accompanying drawings. It will be understood that the particular devices embodying the invention are shown by way of illustration only and not as a limitation of the invention, and that the principals and features of the invention may be employed by other various embodiments without departing from the scope of the invention herein disclosed.

BRIEF DESCRIPTION OF THE DRAWINGS

In the several figures, identical parts are identified by identical numerals.

DESCRIPTION OF THE PREFERRED EMBODIMENT

Figure 1:
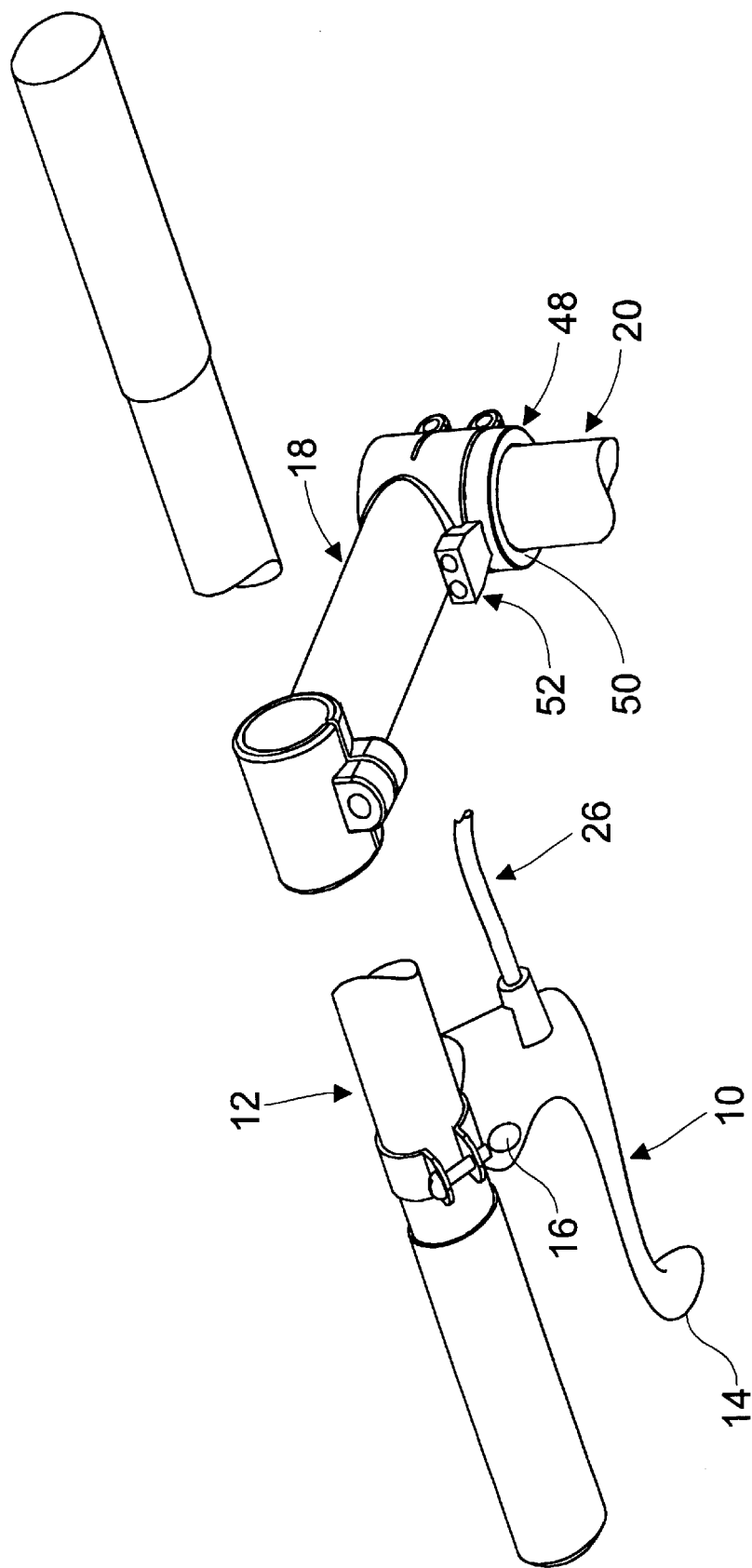
FIG. 1 is a perspective view of a handlebar/steerer tube assembly for a cycle embodying a preferred embodiment of the invention.
Figure 2:
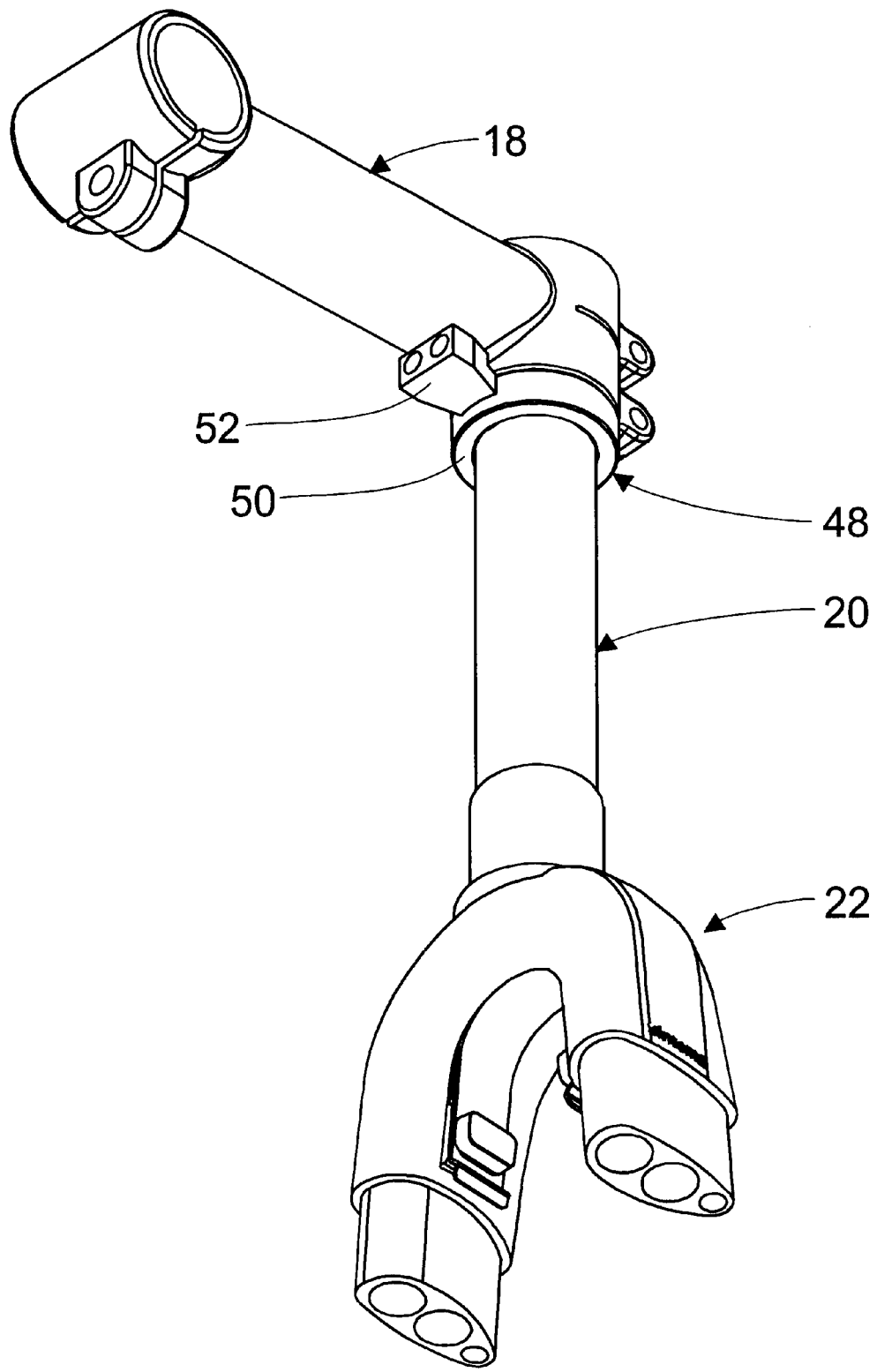
FIG. 2 is a further perspective view on an enlarged scale showing the steerer tube connected to a fork crown embodying the invention.

Referring to FIGS. 1 and 2, the illustrated embodiment of the invention includes a brake actuator 10, typically mounted on a handlebar 12 and typically comprising a hand-operated lever 14 that has a pivot 16. The handlebar is attached to a handlebar stem 18 that is mounted to a steerer tube 20. The latter is rotatably received in the steering tube portion (not shown) of a bicycle frame (not shown). As seen in FIG. 2, steerer tube 20 is attached to a fork crown identified generally by the numeral 22 that contains a caliper brake assembly embodying the present invention.

It should be understood that the invention provides a fork crown assembly (described hereinafter) that may be used as a steering (front) wheel fork crown or a fixed (rear) wheel fork crown. However, for convenience, the following description and certain of the drawings (FIGS. 1–4) provide details of a fork crown assembly 22 in combination with a steerer tube.

Figure 5:
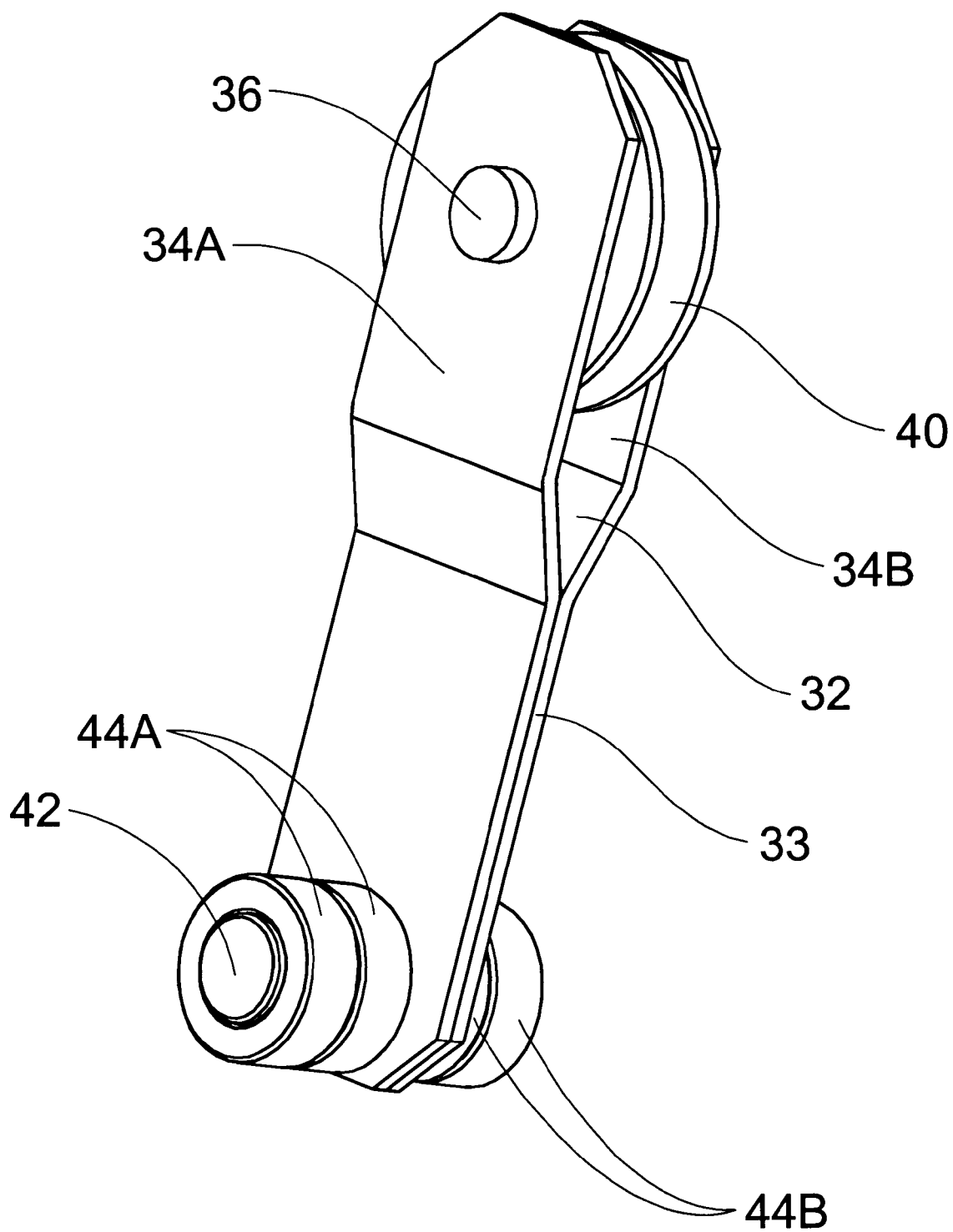
FIG. 5 is an enlarged perspective view of the link member that forms part of the brake operating mechanism.
Figure 6:
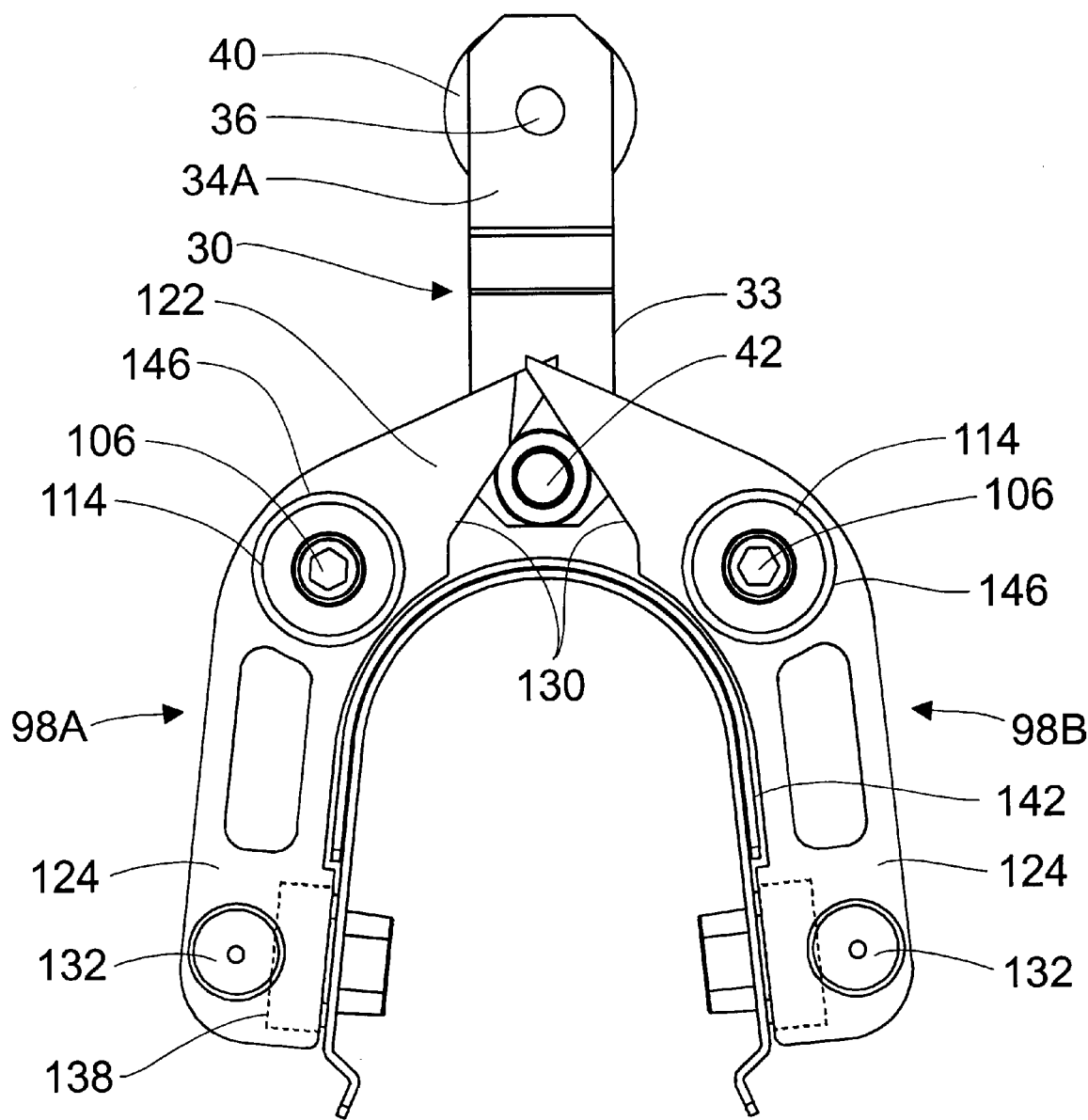
FIG. 6 is a front view in elevation of elements of a brake assembly associated with elements of a cable puller assembly.

Referring to FIGS. 1, 5 and 6, a brake cable 26 has one end connected to brake actuator 10 and its opposite end (not shown) anchored to handlebar stem 18 or another portion of a cycle. Intermediate its ends, the cable passes through a motion transfer mechanism (FIGS. 5–7) for operating the caliper brake assembly hereinafter described which is contained in fork crown 22. The motion transfer mechanism comprises a link member 30 which is formed at one end with a yoke 32 comprising a pair of arms 34A and 34B which are mutually spaced and are provided with holes in which is secured a shaft 36 which rotatably supports a pulley 40 between arms 34A and 34B. The bottom end of the link member 30 carries a shaft 42 on which is mounted two pairs of rollers 44A and 44B, one pair on each side of the link member. Although link member is shown as comprising two sheet metal plates that are bonded together in the region between shafts 36 and 42, it may be formed by casting or machining it as a single piece. The rollers 44A and 44B engage and serve to apply a turning force to the brake caliper arms 94A and 94B which are described hereinafter in detail.

Figure 3:
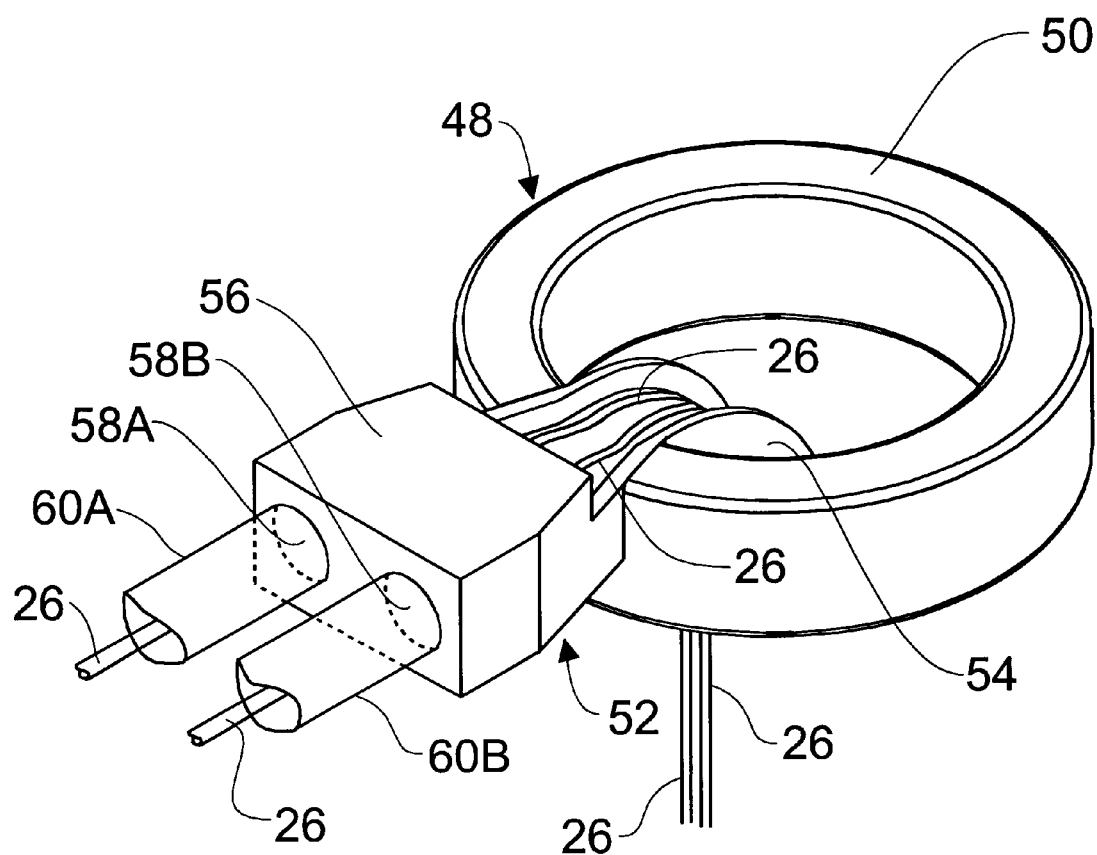
FIG. 3 is an enlarged perspective view of a cable guide ring.
Figure 4:
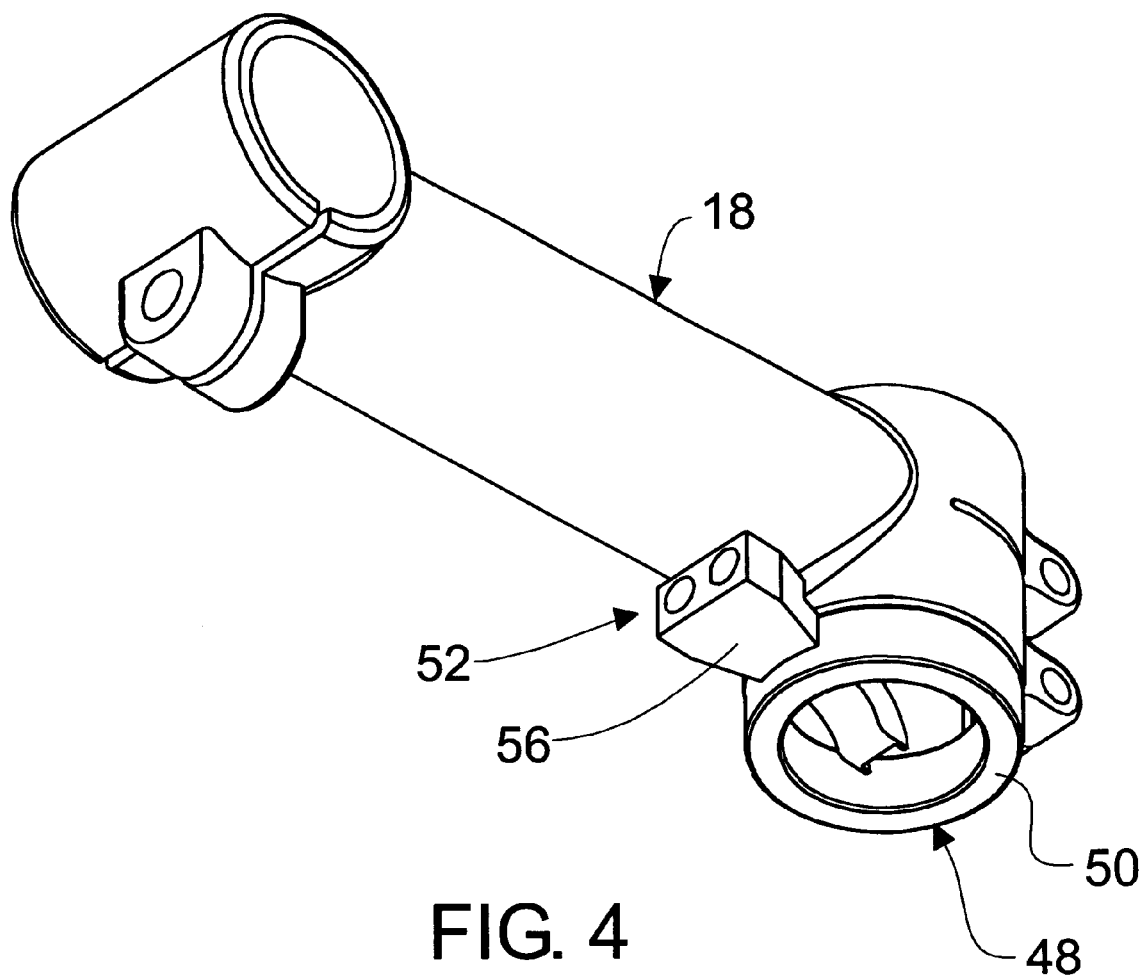
FIG. 4 is an enlarged perspective view showing the cable guide ring in association with a portion of the handlebar/steerer tube assembly.

A first end of brake cable 26 is attached to brake actuator 10. From brake actuator 10 the cable passes via a cable guide assembly 48 (FIGS. 1–4) down into steerer tube 20, around pulley 40, back up the steerer tube, and out from cable guide assembly 48. As noted previously, the second end of the cable 26 is anchored to the cycle, e.g., to the handle bar stem or to a portion of the cycle frame. Referring to FIGS. 3 and 4, the cable guide 48 comprises a ring 50 that surrounds the upper end of the steerer tube 20 and a radially extending cable guide member 52 that comprises a curved guide ramp section 54 which sits in a notch in ring 50 and a connector section 56 that is provided with two ports 58A and 58B. The brake cable passes through ports 58A and 58B. The portions of the cable extending from cable guide member 52 to brake actuator 10, and also to the cable anchor point on the cycle, are housed in and slidable with respect to flexible protective sheaths 60A and 60B. The sheaths 60A and 60b have first ends thereof connected to connector section 56 and second ends thereof (not shown) anchored to actuator 10 and a handle bar stem 18 or a fixed portion of the cycle frame. When brake lever 14 is operated by the cyclist, it causes cable 26 to exert an upward pull on link member 30. When the brake lever is released, the cable tension is removed and the link member can move downward to its original position.

Referring now to FIGS. 9 to 13, the fork crown 22 comprises a housing 70 that is characterized by a first generally U-shaped wall 72 which forms its opposite side wall sections and its top end section, a second wall 74 formed integral with and extending transversely of the first wall 72 and forming the front end of the fork crown, and third and fourth bottom walls 76 and 78 formed integral with the bottom ends of the first and second walls. The first generally U-shaped wall 72 also embodies a cylindrical hollow steerer tube spigot 80 that is formed as an integral extension thereof. Wall 72 has an opening 73 (FIGS. 9,10) that communicates with the interior of spigot 80. The interior diameter of steerer tube spigot 80 is sized so as to snugly receive steerer tube 20. It is to be understood that in the case where the fork crown is used as a rear wheel support, the spigot 80 is mated with and affixed to a tubular portion (not shown) of the rear section of a cycle frame. The steerer tube 20 and spigot 80 are secured together, e.g.,. by welding or by a bonding agent such as an epoxy resin, so as to form a rigid connection.

Figure 9:
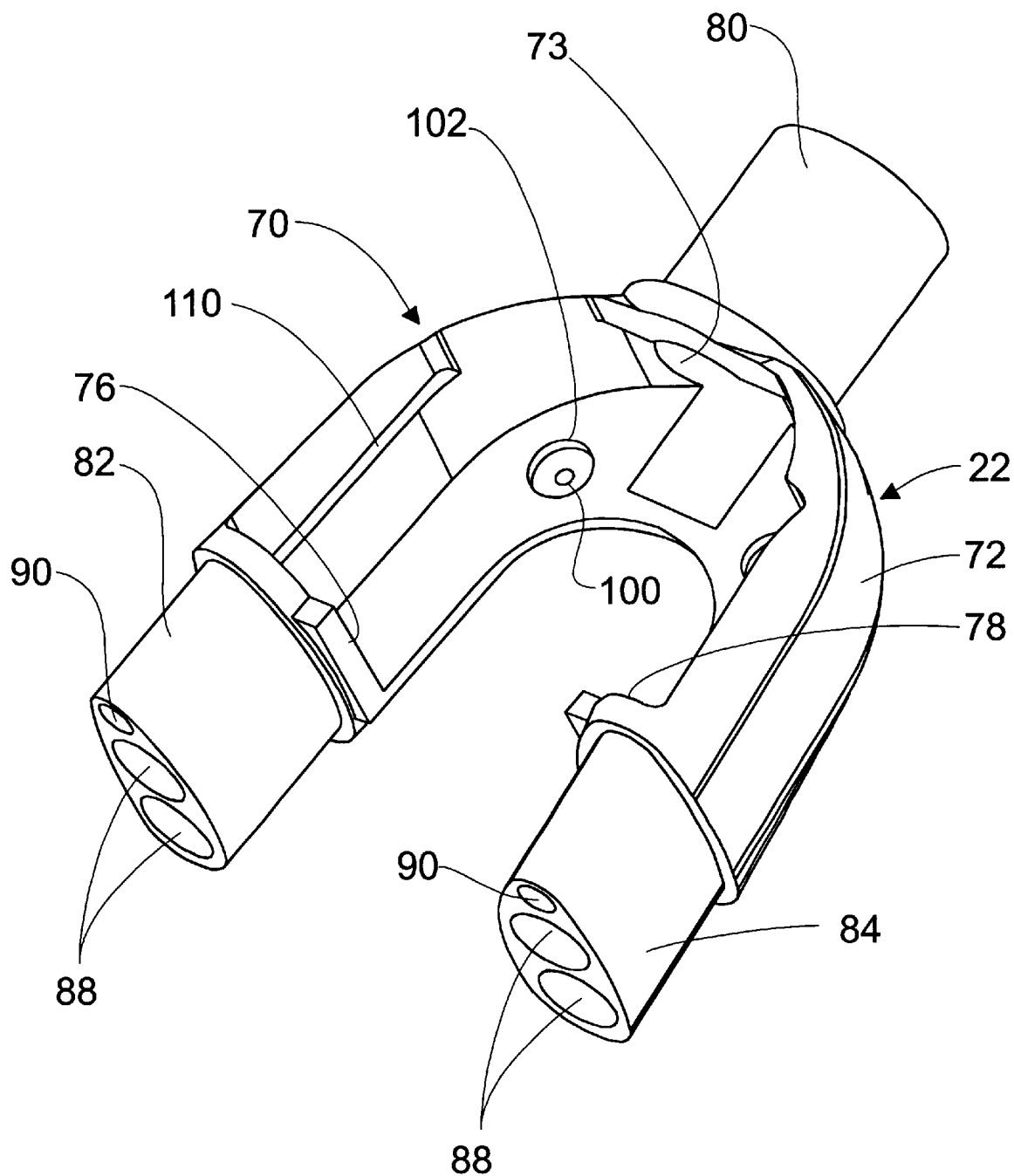
FIG. 9 is a perspective rear view of a preferred form of a fork crown housing.

The bottom walls 76 and 78 have like fork blade spigots 82 and 84 formed integral therewith and depending therefrom. It is to be understood that the fork blade spigots 82 and 84 are designed to mate with and be secured to the upper ends of individual fork arms (not shown) which are adapted at their bottom ends to be attached to and support therebetween a wheel of a cycle. The cross-sectional shape of fork blade spigots 82 and 84 may vary. Thus, they may be circular in cross-section. However, it is preferred, as shown in FIG. 9, that the fork blade spigots have a generally elliptical shape in cross-section. It also is preferred, but not always necessary, to reduce the mass of the fork crown housing by forming cavities in the fork blade spigots, as shown at 88. The fork spigots are provided with holes 90 that extend through bottom walls 76 and 78 for receiving screws 92 (FIG. 14) for securing a cover plate 94 (FIGS. 11–13) to fork crown housing 70.

Figure 10:
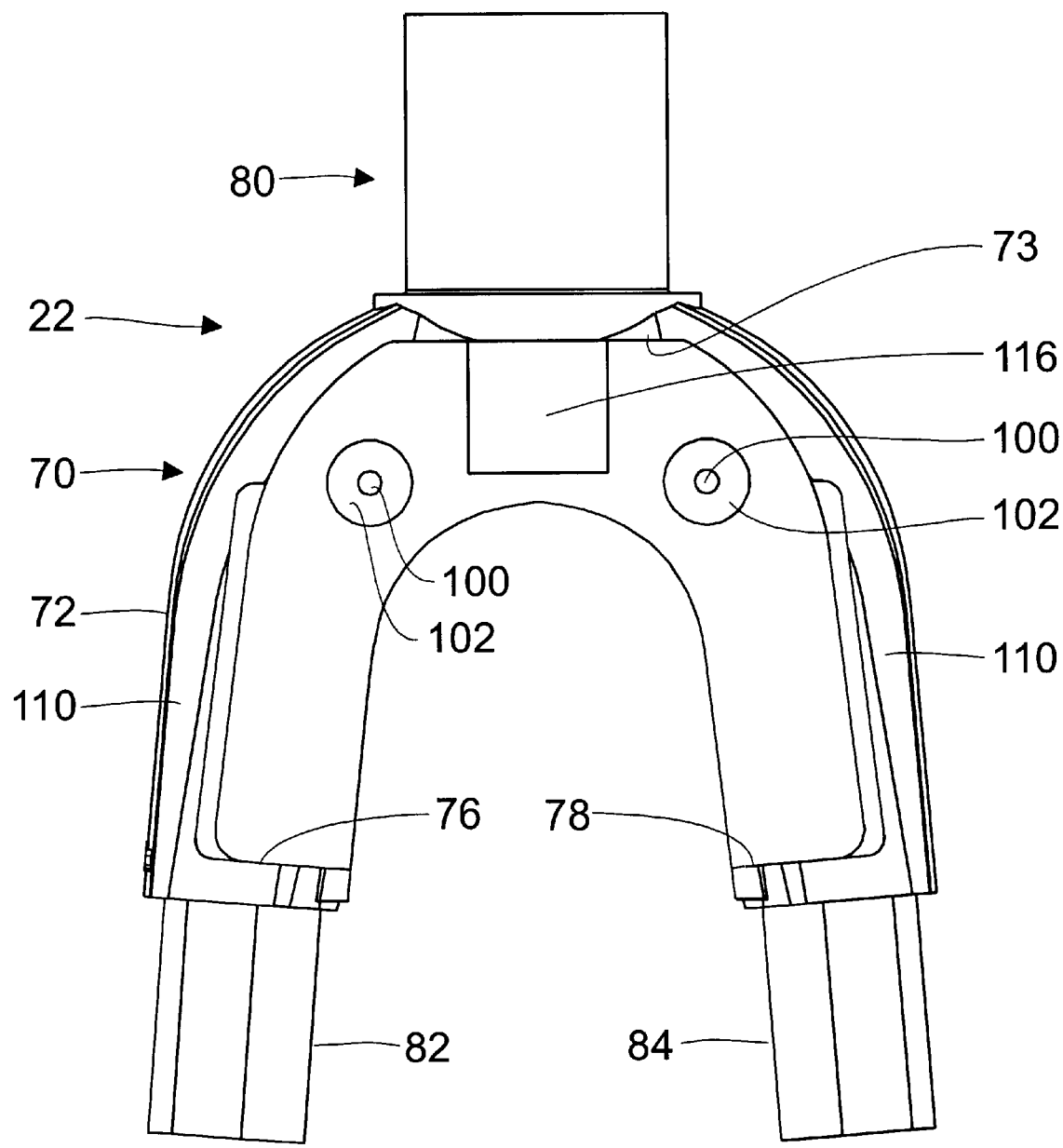
FIG. 10 is a rear elevational view of the fork crown housing of FIG. 7.
Figure 13:
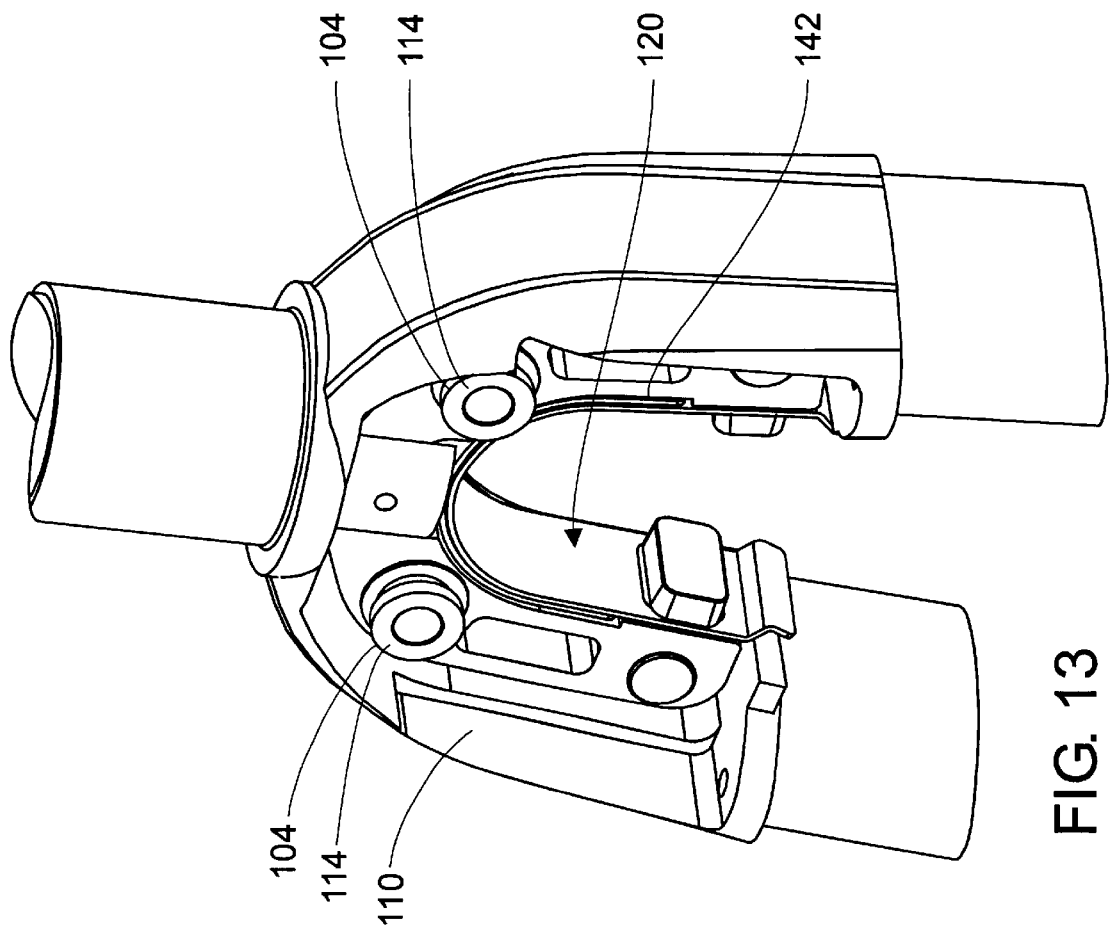
FIG. 13 is an exploded perspective view of the fork crown cover plate and the fork crown housing containing the brake assembly components.
Figure 13:
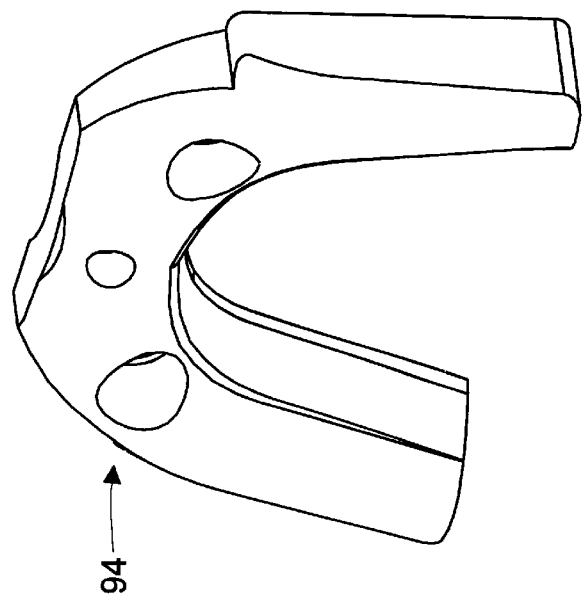

Still referring to FIGS. 9, 10 and 13, fork crown housing walls 72, 74, 76 and 78 coact to define a cavity for accommodating two like caliper brake arms 98A and 98B (FIGS. 6–8, and 14). As seen best in FIGS. 9 and 10, the fork crown housing has a pair of tapped (i.e., threaded) holes 100 which are counterbored as shown at 102. Those counterbores are sized to receive hollow pivot studs 104 (FIGS. 8, 15) which are used to pivotally attach the caliper brake arms to the fork crown housing, while the threaded holes are sized to receive threaded screws 106 which are used to secure the pivot studs to the housing 70.

Figure 11:
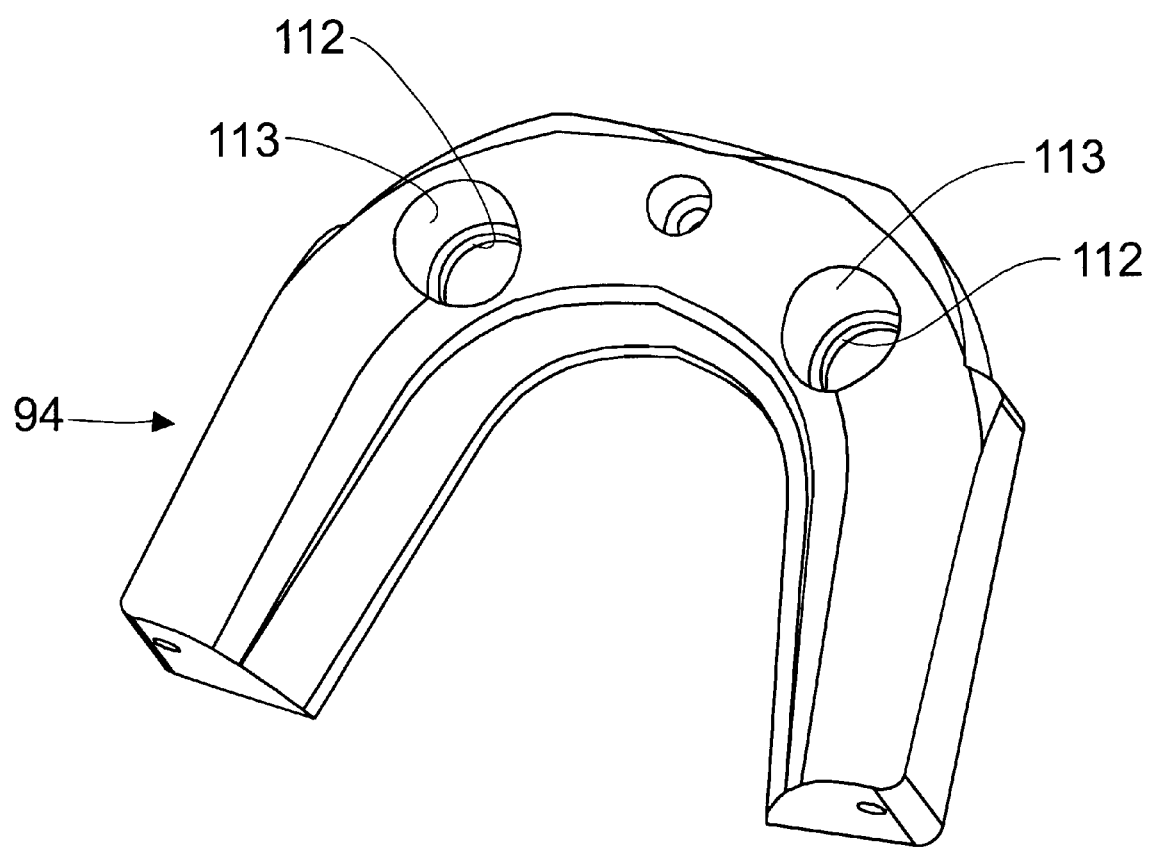
FIG. 11 is a perspective view showing the outer side of the cover plate for the fork crown housing of FIGS. 9 and 10.
Figure 12:
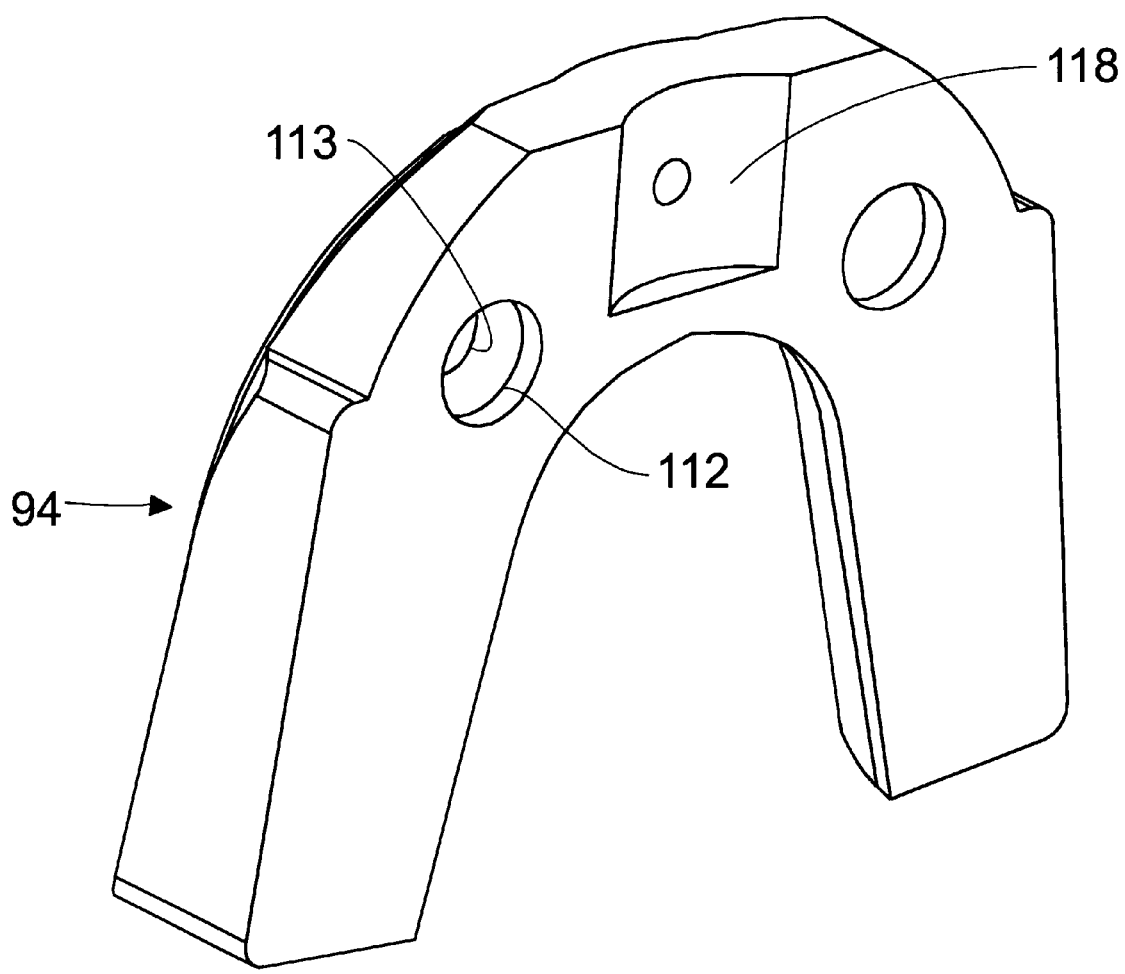
FIG. 12 is a perspective view of the inner side of the cover plate of FIG. 11.

Further with reference to FIGS. 9, 10 and 13, the walls 72, 76 and 78 are cut back on the rear side of the housing so as to form a recess identified generally by the numeral 110 for the purpose of receiving a cover plate 94 (FIGS. 11–13). The cover plate is provided with a pair of holes 112 which are positioned so that when the cover plate is mounted to the fork crown housing, the holes 112 will be aligned with the counterbored holes 100 in the fork crown housing. The holes 112 in cover plate 94 are counterbored as shown at 113, with the larger counterbore section 113 being sized to snugly receive the heads 114 of pivot studs 104, and the holes 112 being sized to snugly receive the shaft of the pivot studs. The bottom surfaces of cover plate 94 have threaded holes 115 (FIG. 14) for receiving the screws 92 that lock the cover plate to the fork housing.

Figure 14:
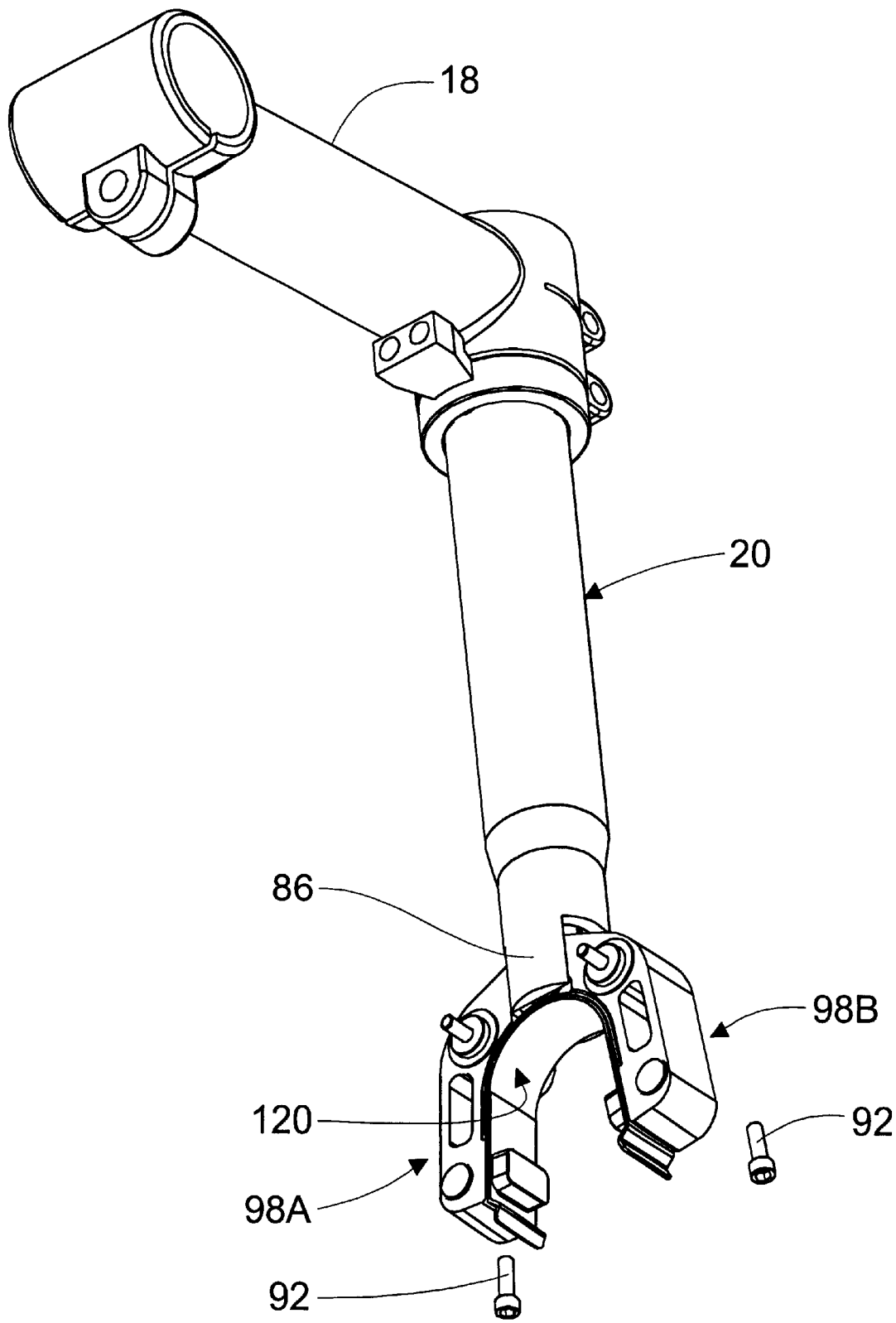
FIG. 14 is a perspective view illustrating how the steerer tube extends down over portions of the brake assembly.

Referring now to FIGS. 9, 10 and 12, cover plate 94 and housing 70 are provided with circularly curved depressions 116 and 118 respectively. These curved depressions are for the purpose of accommodating portions of the bottom end of steerer tube 20 which extend down into spout 80. Referring to FIG. 14, the bottom end of steerer tube 20 is slotted, so as to form a pair of arms 86 of like shape and size (only one arm 86 is visible in FIG. 14). The two arms 86 project into housing 70 and extend down on opposite sides of the upper ends of brake caliper arms 98A and 98B, with the gap between the arms being enough to provide clearance between them and the caliper arms so as to permit the arms to pivot as required when brake actuator 10 is operated.

Figure 7:
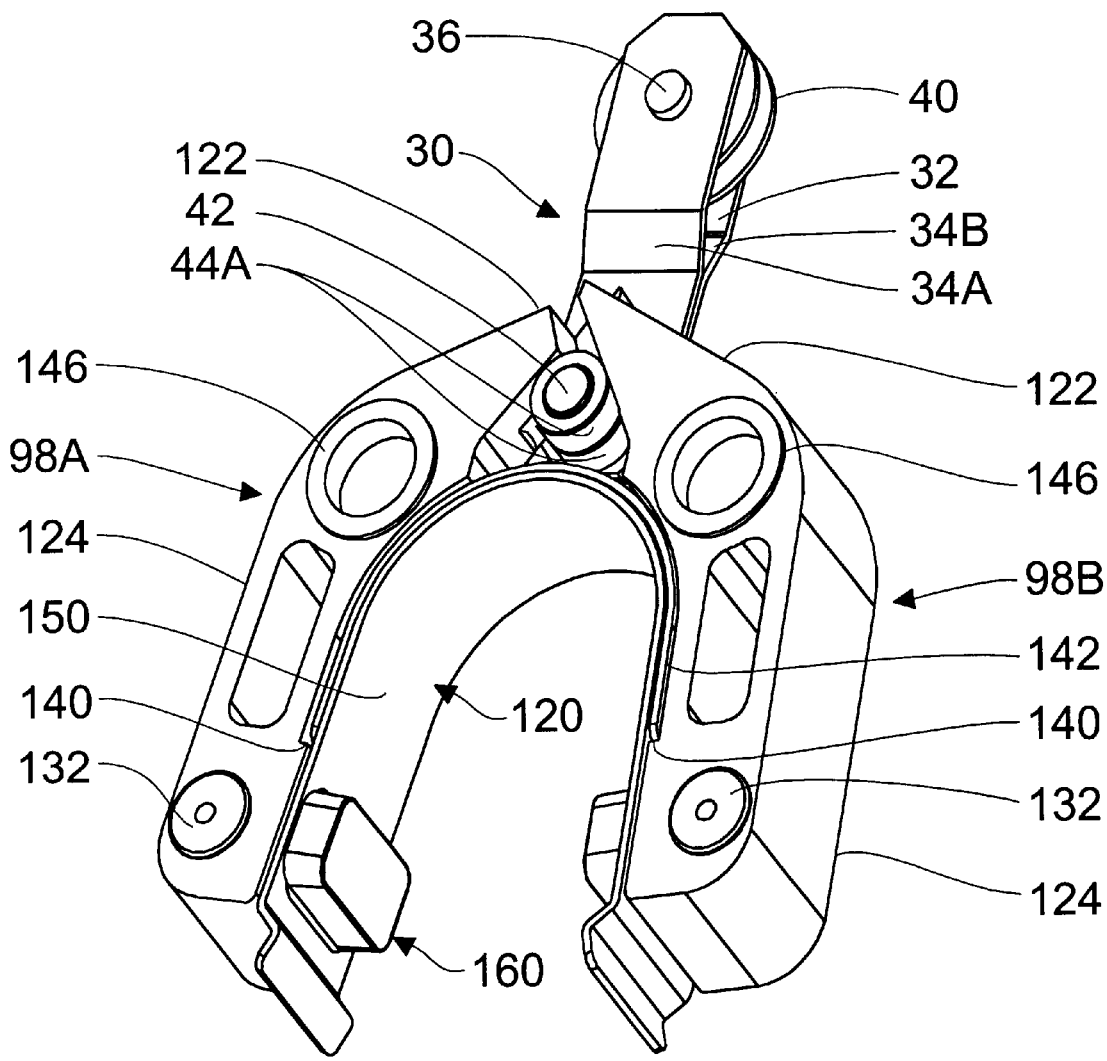
FIG. 7 is a perspective view of the apparatus of FIG. 5, but with certain elements omitted.
Figure 8:
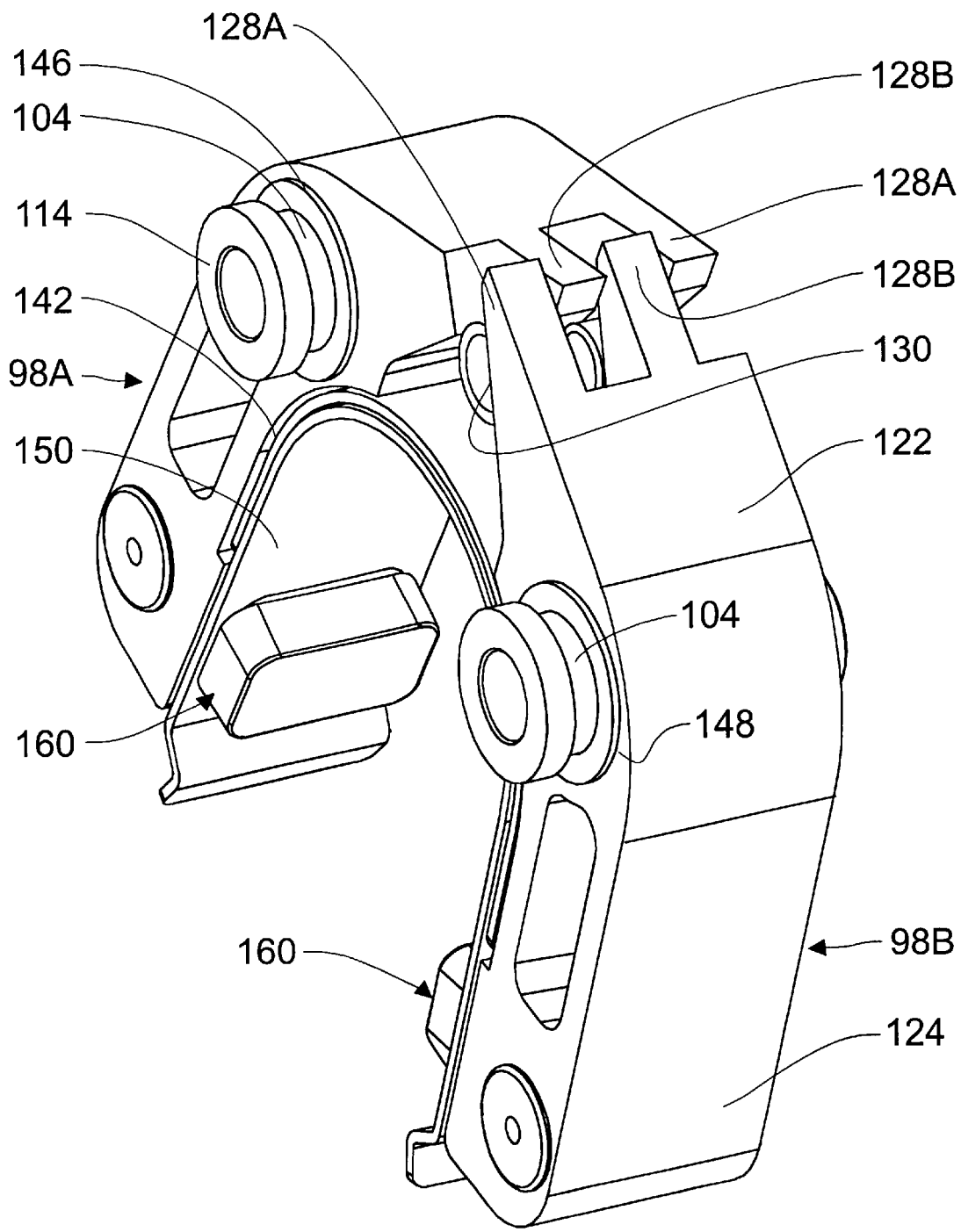
FIG. 8 is a perspective view showing how the fingers of the brake caliper arms are interdigitated.

Referring now to FIGS. 5–8 and 13–16, the brake assembly comprises the two like brake caliper arms 98A, 98B and a brake pad unit 120. As shown in FIGS. 5–8 and 15, each caliper arm consists of a first arm portion 122 and a second arm portion 124 that extend at an angle to one another. At substantially the junction of arm portions 122 and 124, each caliper arm is provided with a pivot hole 126 (FIG. 15) which is sized to closely accommodate one of the pivot studs 104. The arm portion 122 is characterized by a pair of fingers 128A and 128B at its free end (FIG. 8). Those fingers are identically-shaped. In this connection it is to be noted that the first arm portion 122 of each caliper arm is provided on its underside with a ramp surface 130 which includes the corresponding surfaces of the fingers 128A and 128B.

Referring now to FIGS. 6 and 7, preferably, but not necessarily, button-type studs 132 made of a low friction material, e.g., Teflon® are mounted in holes in the opposite faces of the arm portion 124 of each caliper arm. Preferably the edges of the heads of the studs 132 are beveled to minimize wear and friction. The studs 132 are applied to opposite sides of the arm portions 124 for the purpose of minimizing friction resulting from engagement with portions of the housing in which the caliper arms are mounted.

Each of the brake caliper arms 98A and 98b is provided with a rectangular pocket 138 (FIG. 6) which is sized and shaped so as to snugly receive a portion of one of the brake pads 160, as described in greater detail below. Additionally the inner surface of each caliper arm is curved down to a shoulder 140 that is located adjacent to the brake pad pocket 138. Shoulders 140 are engaged by and retain the ends of a retention leaf spring 142 which hugs the curved inner surfaces of the two brake arms and is used to keep those caliper arms in their fully open or spread position (illustrated in FIGS. 6–8). Although leaf spring 142 may be formed with a flat configuration, it is preferred that it be formed with a curved configuration, preferably a generally U-shaped configuration, but with its ends spaced apart from one another by a distance greater than the distance between the shoulders 140 when the brake caliper arms are in their fully open position, so that the ends of the leaf spring need to be squeezed together in order to be inserted inside the arms into engagement with shoulders 140 in the manner shown in FIGS. 6–8.

Figure 15:
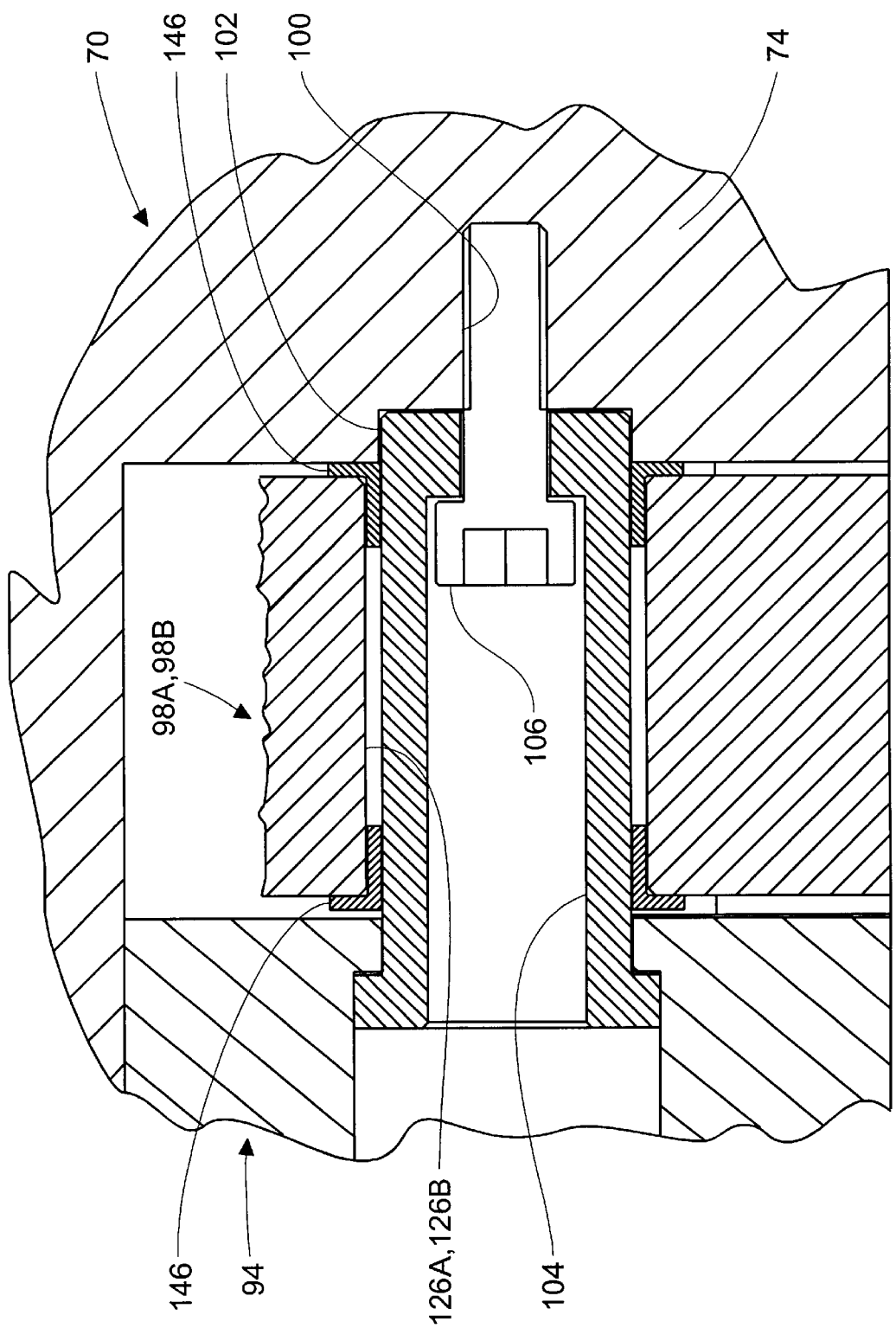
FIG. 15 is a fragmentary cross-sectional view illustrating how the brake caliper arms are rotatably secured to the fork crown housing.

The two caliper arms are mounted to the housing by means of the hollow pivot studs 104 and cylindrical bushings 146 (see FIGS. 6–8 and 15). As seen in FIG. 15, two bushings 146 are associated with each caliper arm, one inserted into each end of the pivot hole 126, with the pivot stud 104 of each caliper arm extending through both of the bushings associated with that caliper arm. Preferably bushings 146 are made of a low friction material, e.g., Teflon®. The bushings are sized to prevent side play of the caliper arms relative to the pivot studs 104 while leaving the caliper arms free to pivot on the pivot studs.

Turning now to FIG. 15, the caliper arms are pivotally secured in the housing by means of the screws 106 which extend through the counterbored holes 112 in cover plate 94 and also the hollow pivot studs 104 and are screwed into the threaded holes 100 in the front wall 74 of the housing.

Figure 16:
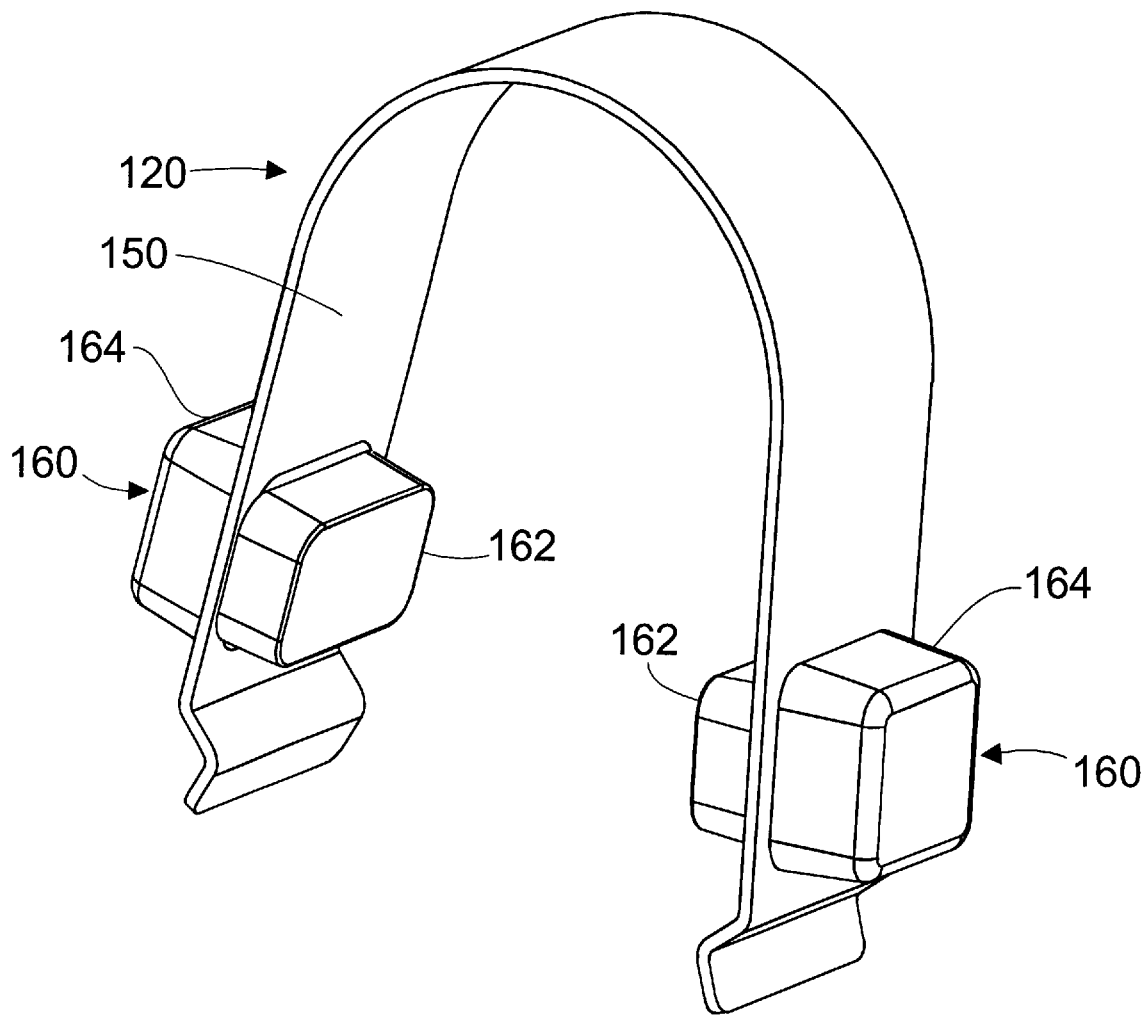
FIG. 16 is a perspective view of a brake unit which constitutes one aspect of the present invention.
Figure 17:
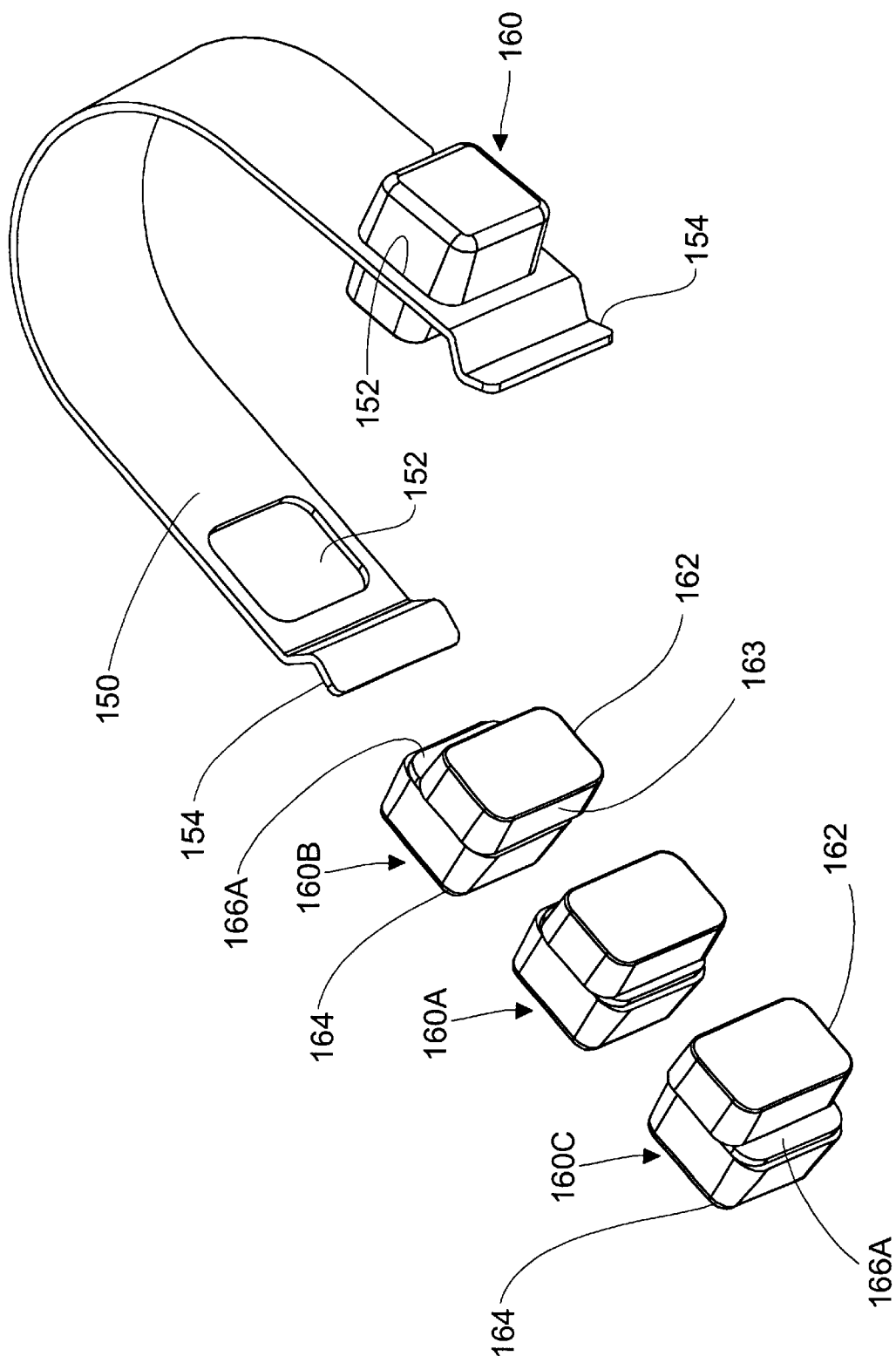
FIG. 17 is an exploded perspective view illustrating alternative forms of brake pads.
Figure 18:
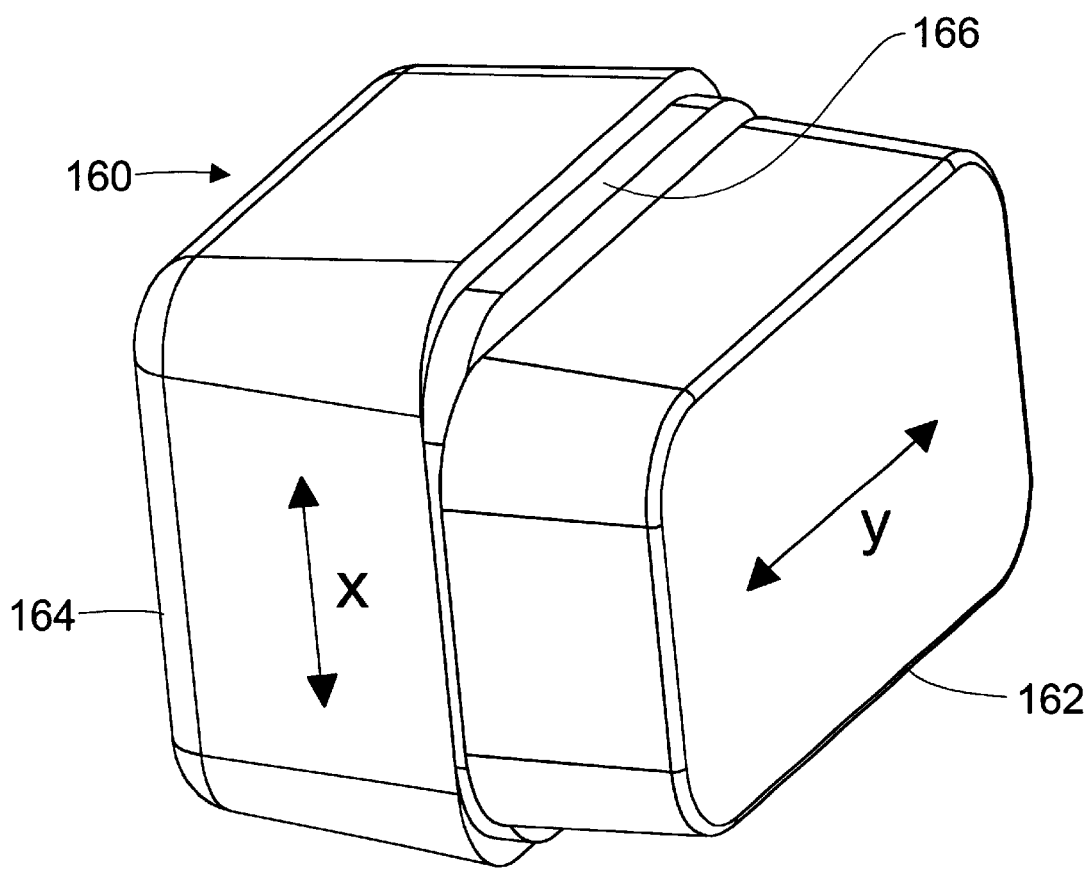
FIG. 18 is an enlarged perspective view of one form of brake pads.

Referring now to FIGS. 16–18, the brake pad unit 120 comprises a leaf spring 150 that is formed with a generally rectangular aperture 152 adjacent each end thereof. It is preferred that the ends of the spring be bent so as to form offset tabs 154 as shown, although the ends of the spring could be flat. The tabs 154 facilitate gripping the ends of the spring in order to remove the brake pad unit from the brake assembly or to install the same or a new brake pad unit. Although the leaf spring may be formed with a flat configuration, it is preferred that it have an arched configuration, i.e., a curved U-shape as shown, to facilitate insertion and removal of the brake pad unit 120 from the brake assembly. Spring 150 is formed so that in its as-formed state its opposite ends are spaced from one another by an amount greater than the spacing between the bottom ends of the two caliper brake arms, so that the opposite ends of the spring need to be forced toward one another in order to install the brake unit in operative association with the two brake caliper arms, i.e., in the position shown in FIGS. 6–8. Preferably the spring 150 is formed with an arched configuration so that its two halves subtend an angle in the range of 30–35° therebetween.

Associated with leaf spring 150 are two brake pads 160. Preferably each brake pad essentially comprises an inner rectangular block portion 162, an outer rectangular block portion 164 which is oversized with respect to the first block portion, and an intermediate stepped portion 166. Referring to FIG. 18, the height of block portion 164 (the dimension indicated by the double arrow X) is greater than that of the corresponding dimension of aperture 152, while the width of block portion 162 (the dimension indicated by the double arrow Y) is greater than the corresponding dimension of aperture 152. The periphery of the intermediate portion 166 is sized to make a substantially exact fit in aperture 152. Block portion 164 has the same width but a greater height than intermediate portion 166, while block portion 162 has a greater width but a lesser height than intermediate portion 166.

The brake pads are formed of a material that has a relatively high coefficient of friction and is relatively stiff, yet capable of being compressed to the extent necessary to permit either block portion 162 or block portion 164 to be inserted through aperture 152. Once either block portion 162 or 164 has been inserted through aperture 152, the brake pad is locked to (retained by) the spring 150 by virtue of the fact that the width of block portion 162 and the height of block portion 164 exceed the corresponding dimensions of aperture 152.

By way of example but not limitation, the brake pad material may be a elastomer or a plastic material, or an elastomer or plastic material which is reinforced by relatively high tensile strength cords or fibers, or a suitable composite material such as one characterized by a cork/epoxy matrix. As used herein, the term "elastomer" means and includes a natural or synthetic rubber or a plastic that has elastomeric or near elastomeric properties. Preferably the brake pads are made of a fiber-reinforced elastomer having a durometer of about 60, Shore A scale. Consequently, when the inner block portions 162 or 164 of the brake pads are pushed into apertures 152, they will yield enough to pass through the apertures, so that the intermediate portions 166 reside in the apertures and the block portions 162 and 164 engage the adjacent faces of the surrounding spring material and thereby lock the brake pad to the spring. Preferably the length (thickness) of intermediate portion 166, i.e., the dimension extending at a right angles to the height and width dimensions, is sized to match the thickness of spring 150, thereby assuring that the brake pad is locked to the spring.

The inner block portion 162 of the brake pad may be centered with respect to the outer block portion 164, in which case the orientation of the brake pads in apertures 152 is of no consequence. Alternatively, the brake pad may be formed so that the block portion 162 is eccentric, i.e., off center, with respect to block portion 164. Consequently the invention provides three brake unit options, as illustrated in FIG. 17. The first option is a brake pad having its block portion 162 centered with respect to its block portion 164 (see pad 160A). The second and third options involve a brake pad that has its block portion 162 located eccentric to its block portion 164, and also has a centered stepped portion 166A corresponding to stepped portion 166 that is sized to make a close fit in aperture 152, so that block portions 162 and 164 can engage opposite faces of the spring and thereby lock the brake pad to the spring. This brake pad can be mounted in aperture 152 in a first orientation (see brake pad 160B) in which its eccentric block portion 162 is close to one end of the spring, or in a second orientation, rotated 180° from the first orientation (see brake pad 160C), in which its eccentric block portion 162 is located further from the ends of the leaf spring.

The larger block portions 164 of brake pads 160 are sized so as to make a close, almost tight, fit in pockets 138. The depth of each pocket 138 is just sufficient to fully accept that part of the block portion 164 which protrudes out from the outer (back) side of leaf spring 150, thereby allowing that spring to lie tight against retention spring 142, while the portion of the brake arm forming the inner end surface of the pocket (i.e., the bottom wall of the pocket) physically restrains the adjacent pad 160 against movement away from the other brake pad when they are engaged with a wheel during a braking operation. Preferably, the depth of the pocket is such its inner end surface is within the range of 0.000 to 0.003 inch relative to the adjacent part of brake pad 160 when the brake arms are in their open position, i.e., when the brake pads 160 are out of engagement with the adjacent cycle wheel.

Referring to FIG. 8, the caliper arms 98A and 98b are mounted in housing 70 so that the fingers 128A and 128B of one caliper arm are interleaved with the corresponding fingers 128A and 128B of the other caliper arm. The length of the fingers is such that they remain interleaved with one another, i.e., interdigitated, even when the arms are forced to pivot from their open position (FIGS. 6,7) in the direction required for a braking operation. When the caliper brake arms 98A and 98B are installed in housing 70 with cover plate 94 secured in place, the low friction bushings 146 and studs 132 assure that the caliper brake arms are free to pivot when the actuator 10 is operated.

Referring now to FIG. 13, each brake unit 120 may be installed or removed without having to remove cover plate 94, since the tabs 154 are accessible even when the cover plate is locked to housing 70. Installing a brake unit 120 is achieved by manually gripping the tabs 154 on the ends of the spring and forcing them together far enough to enable the brake unit to be inserted between the two caliper arms and to permit the protruding parts of the larger block portions 164 of the brake pads 160 to be inserted into the pockets 138. It should be noted that inserting or removing a brake pad unit 120 is facilitated by the presence of retention spring 142 which keeps the brake arms 98A and 98b in the open position shown in FIGS. 6–8.

Installation of the brake arms 98A and 98B in housing 70 is accomplished so that the lower portion 33 (FIG. 5) of link member 30 extends down between the fingers 128B of the two brake arms, with the rollers 44A engaging the ramp surface portions of finger 128A of brake arm 98B and finger 128B of brake arm 98A, and rollers 44B engaging the ramp surface portions of finger 128A of brake arm 98A and finger 128B of brake arm 98B.

As is apparent from FIGS. 6 and 7, an upward pulling force on link member 30 will cause the rollers 44A, 44B to exert a camming force on the fingers 128A, 128b of brake arms 98A and 98b, causing the arms to pivot in a direction that will bring the two brake pads 160 closer to one another. More specifically, with reference to FIG. 6, when the link member 30 is pulled upward, the rollers 44A and 44B will cause the brake caliper arms 98A and 98B to pivot counterclockwise and clockwise respectively. It is preferred that the amount of permissible movement of the link member 30 caused by operation of actuator 10 be sufficient to allow the smaller block portions 162 of the brake pads to move toward one another far enough for their end surfaces 170 (FIGS. 6, 7) to engage opposite side surfaces of a cycle wheel tire (not shown) with a force adequate to create a braking action on the cycle.

Figure 19:
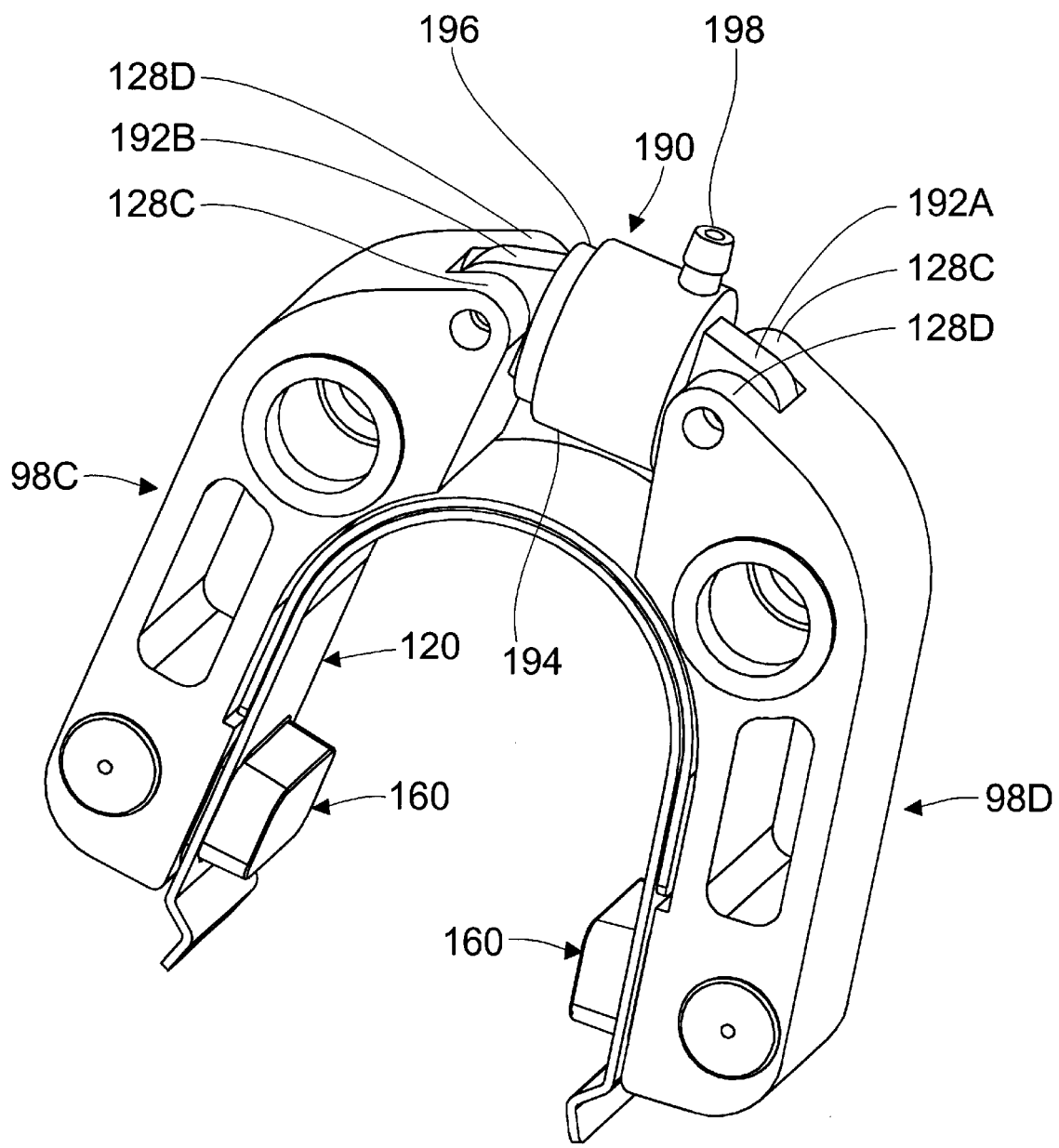
FIG. 19 is a perspective view of an alternative embodiment of the invention that utilizes a hydraulic cylinder for operating the brake assembly.

FIG. 19 shows a modification of the invention which is characterized by a conventional hydraulic actuator 190 for operating the brake arms. In this case the two like brake arms 98C and 98D differ from the brake arms 98A and 98B in that they each have two fingers 128C and 128D that are spaced from one another by a gap that is sufficient to accommodate ears 192A and 192B that protrude from actuator 190. Actuator 190 comprises a cylinder 194 that carries a perforated ear 192A and a piston 196 that is mounted for reciprocal movement in cylinder 194 and carries a perforated ear 192B. Pivot pins (not shown) connect ear 192A to fingers 128C and 128D of brake arm 98D and ear 192B to fingers 128C and 192D of brake arm 98C. Cylinder 194 has at least one fluid port 198 that is adapted to be connected to a conduit or hose (not shown) that in turn is connected by a hydraulic pressure supply or plenum (not shown) and an actuator (also not shown) that replaces actuator 10 and is operable to vary the fluid pressure applied to cylinder 194 so as to cause the piston 196 to move axially away from cylinder 194, whereby operation of the actuator will cause the brake arms 98C and 98D to pivot in a direction to cause the brake pads to apply a braking force to an adjacent cycle wheel. When the fluid actuator (not shown) is not operated, the pressure applied to cylinder 194 is reduced enough to allow the brake caliper arms 98C and 98D to return to their open non-braking position.

The invention may be practiced in ways other than as described and illustrated. Thus, for example, each brake caliper arm may have only one finger, rather than the two fingers as shown in FIGS. 8 and 19. Also the fork crown housing may be modified, as may the way in which the cable 26 is attached and supported. A further possible modification is eliminate the cable guide 48 and provide the steerer tube with side or top openings to permit the cable to be passed down around the pulley 40 of link member 30. Also the shape of the brake pads may be altered. Thus, for example, the portions 162, 164 and 166 of the brake pads may have a round rather than a rectangular configuration. Still other modifications are rendered obvious to persons skilled in the art from the foregoing description and the several figures of the drawings.

This invention offers a number of advantages over the invention described and claimed in my U.S. Pat. No. 5,803,207 for "Brake Assembly For A Cycle". For one thing, it provides a new and improved brake pad unit. A second advantage is that it facilitates installation and removal of the brake pads and the brake pad unit. Also the life of the brake pads may be extended by removing them from the brake unit spring and re-inserting them in the spring with a reversed orientation as noted above. A further advantage is obtained from the fact that the brake arms are interdigitated. In this connection it should be noted that when the brake actuator 10 is operated to create a braking action, there is a possibility that the reaction force of the wheel on the brake pads could tend to exert a torsional force on one or both of the two brake arms. Also when the brake actuator is operated, there is a possibility that movement of link member 30 could tend to exert torsional force on one or both of the brake arms. Any such torsional force might impede pivotal movement of the brake arms or increase the amount of force required to pivot the brake arms to effect a braking action. However, operation of the brake arms is adversely affected minimally, if at all, by any such torsional force for the reason that interleaving the fingers of the two brake arms results in the two brake arms coacting to resist any force that impedes or otherwise interferes with pivotal movement of the two brake arms. A further advantage of the invention is that it reduces manufacturing costs and facilitates brake maintenance and repair.

What is claimed is:

1. In combination with a cycle fork crown, a caliper brake assembly comprising:
    first and second caliper arms pivotally mounted to said fork crown at first and second pivot points respectively, each of said caliper arms having first and second arm portions extending at an angle to one another, said first arm portions each having a ramp surface for engagement by means for pivoting said arms in a direction to move said second arm portions toward one another, and said second arm portions each having a pocket therein; and
    a brake unit comprising a leaf spring having first and second ends and an aperture adjacent each end, a first brake pad mounted in the said aperture at said first spring end and a second brake pad mounted in the said aperture at said second spring end, each of said brake pads having a first side portion that projects from one side of said leaf spring and a second opposite side portion that projects from the opposite side of said leaf spring, said brake unit being disposed between said first and second caliper arms such that said spring is embraced by said caliper arms and said second side portions of said brake pads extend into said pockets, said leaf spring acting to bias said brake pads away from each other and toward said pockets, said brake unit being removable from said caliper arms by squeezing the ends of said leaf spring toward each other far enough to move the said second portions of said brake pads clear of their respective pockets.

2. The combination according to claim 1 wherein said leaf spring also acts to bias said caliper arms to pivot in a direction to move first arm portions toward one another.

3. The combination according to claim 1 wherein said second side portions of said brake pads make a close fit in said pockets.

4. The combination according to claim 1 wherein each end of said leaf spring is bent so as to form a tab portion to facilitate manually squeezing the ends of said spring toward one another for the purpose of moving said brake pads toward one another so as to free them from said pockets.

5. The combination according to claim 1 wherein said leaf spring, in its as formed state, is curved between its ends.

6. The combination according to claim 1 further including a second leaf spring disposed between said first-mentioned leaf spring and said first and second caliper arms for biasing said caliper arms in a direction that prevents said second arm portions from moving toward one another, whereby said caliper arms are restrained from pivoting in a direction to move said second arm portions toward one another when said brake unit is removed from between said caliper arms.

7. The combination according to claim 1 wherein said second arm portion of each caliper arm is provided with a shoulder, and further wherein the opposite ends of said second leaf spring are engaged with said shoulders.

8. The combination according to claim 1 wherein said first side portions of said brake pads comprise first rectangular blocks having a width, height and depth, and said second side portions of said brake pads comprise second rectangular blocks also having a width, height and depth, with at least the width or height of said second rectangular block side portion being greater than the corresponding dimension of said first side portion.

9. The combination according to claim 8 wherein said first rectangular blocks are centered with respect to said second rectangular blocks.

10. The combination according to claim 8 wherein said first rectangular locks are offset with respect to said second rectangular blocks, whereby the position of said first rectangular blocks can be altered by rotating them 180 degrees with respect to said apertures.

11. The combination according to claim 8 wherein each of said brake pads is formed with a stepped-down section between said first and second blocks, said stepped-down sections being sized so as to make a close fit in said apertures.

12. The combination according to claim 8 wherein each of said caliper arms has first and second arm portions extending at an angle to one another, and said pockets are formed in said second arm portions remote from said first arm portions, and further wherein each of said first arm portions has at least two parallel mutually spaced fingers extending from the end thereof that is remote from the corresponding second arm portion, with the fingers of one arm portion being interleaved with the fingers of the other arm portion.

13. The combination according to claim 8 wherein said fingers include portions of said ramp surfaces.

14. The combination according to claim 8 further including a hydraulic actuator comprising a cylinder, and a piston mounted within said cylinder and arranged to move bidirectionally relative to said cylinder in response to changes in hydraulic pressure, said actuator being disposed between the adjacent ends of said first arm portions of said first and second caliper arms, with said cylinder being attached to one first arm portion and said piston being attached to the other first arm portion, whereby movement of said piston relative to said cylinder will cause said caliper arms to pivot so as to move said second arm portions toward or away from one another.

15. The combination of claim 1 wherein said brake pads are releasably interlocked with said spring.

16. The combination of claim 1 wherein said spring has first and second opposite surfaces and further wherein said brake pads have surface portions that overlap said first and second opposite surfaces of said spring around said apertures.

17. A fork crown for attachment to a cycle and a brake assembly carried by said fork crown,
said fork crown comprising a housing having a first generally U-shaped wall forming its opposite sides and top, a second wall formed integral with and extending transversely of said first wall and forming the front end of said fork crown, and third and fourth bottom walls formed integral with bottom ends of said first and second walls, and a removable cover plate attached to said housing so as to form the rear end of said fork crown, said housing and said cover plate cooperating to define a U-shaped cavity therebetween with said cavity being open at the side thereof that is opposite said first U-shaped wall;
said brake assembly comprising first and second brake caliper arms disposed in said cavity adjacent said second wall, said caliper arms each comprising first and second arm portions, said first arm portions having at least two fingers with the fingers of said first caliper arm being interleaved with the fingers of said second caliper arm, and said second arm portions being adapted to carry brake pads; and
pivot means extending at a right angle to said second wall for pivotally connecting said brake caliper arms to said housing so that said caliper arms can pivot in a plane extending parallel to said second wall;
said first arm portions having a ramp surface for engagement by means for pivoting said arms in a direction to move said second arm portions toward one another.

18. The combination of claim 17 wherein pivotal movement of said arms in a direction to move said second arm portions away from one another is limited by engagement of said arms with portions of said housing.

19. The combination of claim 17 wherein said housing has first and second fork spigots formed integral with and depending from said third and fourth wall respectively for connecting said fork crown to first and second fork blades respectively.

20. The combination of claim 17 wherein said first wall has an opening at said top, and further including a hollow steerer tube spigot formed integral with and projecting from said first wall, said steerer tube spigot being aligned with said opening.

21. The combination of claim 17 further including brake pads carried by said second arm portions of said first and second brake caliper arms.

22. The combination of claim 17 wherein each caliper arm has a recess formed in its said second arm portion, and further including a brake pad unit comprising a leaf spring having first and second ends, first and second apertures formed in said spring, said apertures being located adjacent said first and second ends of said spring, and brake pads mounted in each of said apertures, said brake pad unit being disposed with said leaf spring between and biasing said caliper arms and with each brake pad extending into one of said recesses.

23. The combination of claim 22 further including a second leaf spring disposed between said first-mentioned leaf spring and said first and second caliper arms for biasing said caliper arms in a direction that prevents said second arm portions from moving toward one another, whereby said caliper arms are prevented from pivoting in a direction to move said second arm portions toward one another when said brake unit is removed from between said caliper arms.

24. The combination of claim 17 wherein said pivot means comprises a pair of hollow pivot pins.

25. The combination according to claim 17 wherein said means for pivotally connecting said brake caliper arms to said crown comprises first and second pivot pins each having a clearance hole therein, and further including first and second fasteners inserted through said clearance holes of said first and second pivot pins and screwed into said housing for locking said pivot pins to said crown.

26. The combination according to claim 17 wherein each of said second arm portions comprises a first end attached to the corresponding first arm portion and a second end that is remote from said corresponding first arm portion, and further including force-applying means engaged with said fingers for applying force to said first arm portions so as to cause first and second caliper brake arms to pivot in a direction such as to move said second ends of said second arm portions toward one another.

27. The combination according to claim 26 wherein said force-applying means comprises a roller support member, and a pair of coaxial rollers attached to said roller support member, said rollers being disposed so as to engage said fingers and be able to exert said force on said fingers.

28. In combination with a cycle comprising an operator-actuatable brake operating means mounted on said cycle, a motion transfer assembly coupled to and extending from said brake operating means and movable thereby, a brake actuating mechanism connected to said motion transfer assembly, and a fork crown having a cavity therein, the improvement comprising:
a brake assembly comprising first and second brake caliper arms each having first and second arm portions, with said first arm portions of said first and second brake caliper arms having fingers that are interleaved with one another and said second arm portions each having a pocket for receiving a portion of a brake pad, said caliper arms being pivotally mounted in said cavity, and said caliper arms being movable on their pivots by said brake actuating mechanism acting on said fingers in response to movement of said motion transfer assembly so as to move said brake pads into engagement with a wheel of said cycle; and a separable brake unit that comprises a leaf spring having said first brake pad fixed to a first end thereof and said second brake pad fixed to a second end thereof, said brake unit being inserted between said first and second caliper arms with said spring biasing said brake pads into said pockets, said brake unit being removable from engagement with said caliper arms by squeezing said brake pads toward each other against the bias of said spring until said brake pads are clear of said pockets;
and further wherein said motion transfer assembly comprises a brake cable fixed to said operator actuatable brake operating means and movable thereby, a pulley engaged with said brake cable and movable thereby, and a force-transmitting operating member connected to said pulley and depending therefrom, and said brake actuating mechanism comprises at least a pair or rollers carried by said force-transmitting operating member and disposed to engage and exert a pivoting force on said first arm portions of said first and second brake caliper arms.

29. The combination of claim 28 wherein each of said first arm portions has first and second parallel and mutually spaced fingers, with said first and second fingers of said first arm being interleaved with said first and second fingers of said second arm and with said second fingers being adjacent to one another, and further wherein said operating member extends between said second fingers of said first and second arms.

30. The combination of claim 28 wherein said leaf spring has a hole adjacent said first and second ends thereof, and said brake pads extend through said holes and are mechanically interlocked with said spring.

31. The combination of claim 30 wherein said brake pads are releasably interlocked with said spring.

32. The combination of claim 30 wherein said spring has first and second opposite surfaces and a hole adjacent each of said first and second ends thereof, and further wherein said brake pads extend through said holes and have surface portions that overlap said first and second opposite surfaces of said spring.

* * * * *

UNITED STATES PATENT AND TRADEMARK OFFICE
CERTIFICATE OF CORRECTION

PATENT NO. : 6,308,806 B1
DATED : October 30, 2001
INVENTOR(S) : Peter M. Nielsen It is certified that error appears in the above-identified patent and that said Letters Patent is hereby corrected as shown below:

Column 10,
Line 35, change "locks" to -- blocks --.

Column 12,
Line 56, change "or rollers" to -- of rollors --.

Signed and Sealed this

Fourth Day of June, 2002

Attest:

JAMES E. ROGAN
Attesting Officer    Director of the United States Patent and Trademark Office